United States Patent [19]
Mizokami et al.

[11] Patent Number: 5,519,683
[45] Date of Patent: May 21, 1996

[54] INFORMATION RECORDING/REPRODUCING DEVICE AND METHOD IN WHICH A RESYNCHRONIZATION SIGNAL IS INSERTED INTO THE DATA AT PREDETERMINED INTERVALS

[75] Inventors: Takuya Mizokami, Odawara; Atsushi Saito, Ichikawa; Naozane Yoshida; Takehiko Sekine, both of Yokohama, all of Japan

[73] Assignees: Hitachi, Ltd., Tokyo; Hitachi Video Engineering, Inc., Yokohama, both of Japan

[21] Appl. No.: 288,109

[22] Filed: Aug. 10, 1994

Related U.S. Application Data

[62] Division of Ser. No. 991,469, Dec. 15, 1992, Pat. No. 5,383,171, which is a continuation of Ser. No. 588,361, Sep. 26, 1990, Pat. No. 5,229,986.

[30] Foreign Application Priority Data

Sep. 26, 1989 [JP] Japan ..................... 1-249994

[51] Int. Cl.⁶ ......................... H04N 5/76; G11B 5/09
[52] U.S. Cl. .............................. 369/59; 360/51
[58] Field of Search ...................... 369/48, 59, 53, 369/54; 360/41, 48, 51; 371/6, 42

[56] References Cited

U.S. PATENT DOCUMENTS

| | | | |
|---|---|---|---|
| 4,484,176 | 11/1984 | Fitzpatrick | 369/59 X |
| 4,544,962 | 10/1985 | Kato et al. | 360/40 |
| 4,774,701 | 9/1988 | Ozaki et al. | 369/59 |
| 4,777,542 | 10/1988 | Ozaki | 360/48 |
| 4,835,759 | 5/1989 | Saito et al. | 369/59 |
| 4,862,443 | 8/1989 | Tsuji et al. | 369/59 |
| 4,866,692 | 9/1989 | Saito et al. | 369/59 |
| 4,873,680 | 10/1989 | Churg et al. | 369/116 X |
| 4,928,187 | 5/1990 | Rees | 360/40 |

FOREIGN PATENT DOCUMENTS

| | | |
|---|---|---|
| 62-8370 | 1/1987 | Japan . |
| 2105152 | 7/1982 | United Kingdom . |

*Primary Examiner*—Won Tae C. Kim
*Attorney, Agent, or Firm*—Kenyon & Kenyon

[57] ABSTRACT

If information is to be recorded on and reproduced from a recording medium in correspondence between a code train in the form of a run-length-limited code and the positions of the leading edge and the trailing edge data of a status transition pattern such as pits, recording domains, a sync signal is inserted at regular intervals in the information converted in the form of the run-length-limited code. The sync signal is constituted by a code train capable of deciding that the sync signal includes a code not existing in the conversion rule into a run-length-limited code during reproduction using a leading edge data or trailing edge data relative to the transition pattern.

5 Claims, 12 Drawing Sheets

FIG. 2
| DATA | CODE TRAIN |
|---|---|
| 0 0 0 | 0 0 0 1 0 0 |
| 1 0 | 0 1 0 0 |
| 0 1 0 | 1 0 0 1 0 0 |
| 0 0 1 0 | 0 0 1 0 0 1 0 0 |
| 1 1 | 1 0 0 0 |
| 0 1 1 | 0 0 1 0 0 0 |
| 0 0 1 1 | 0 0 0 0 1 0 0 0 |
FIG. 3A
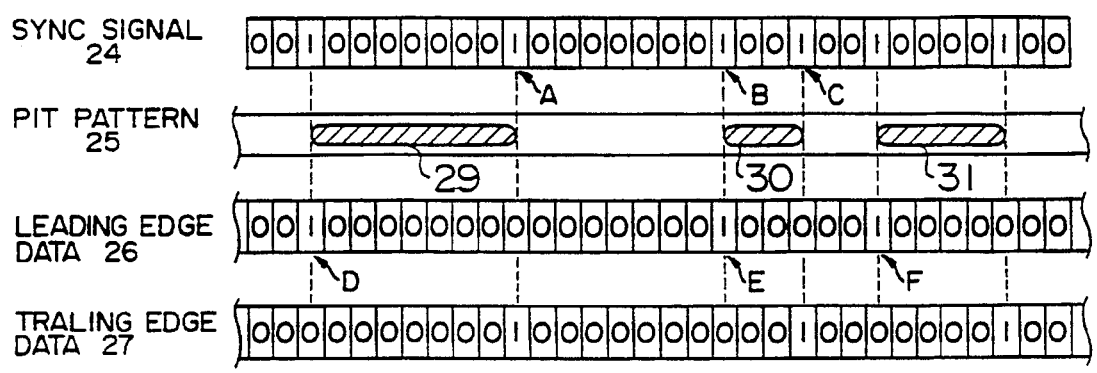
FIG. 3B
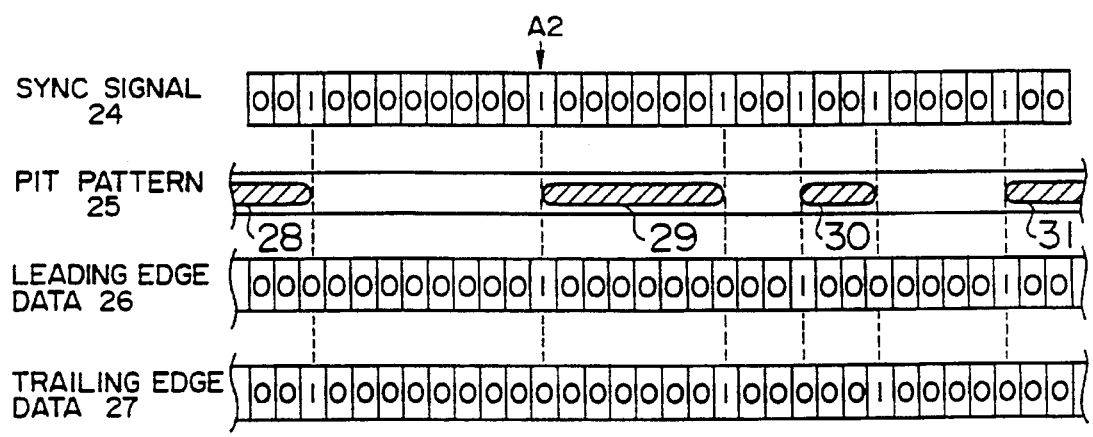

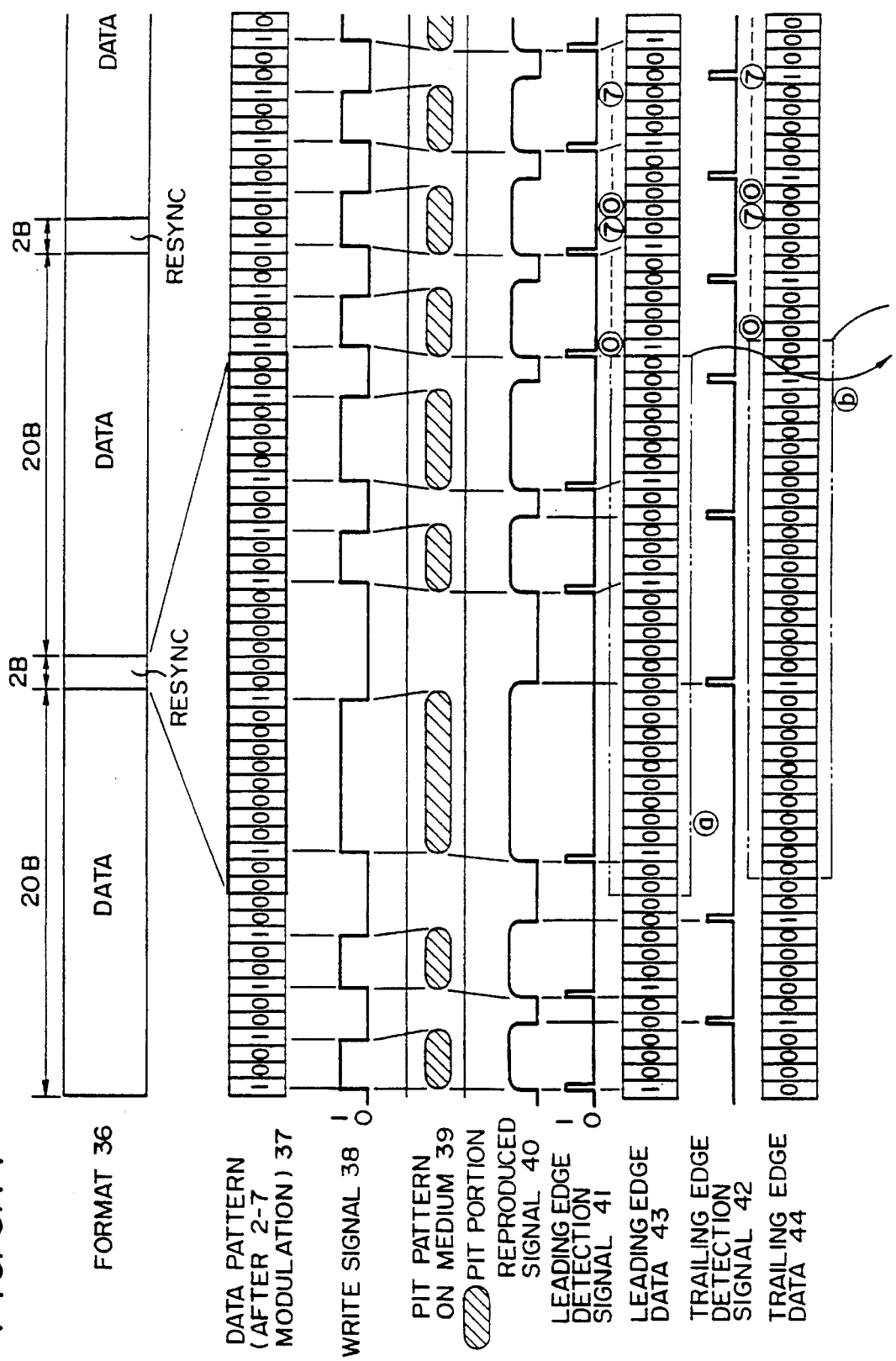

FIG. 11
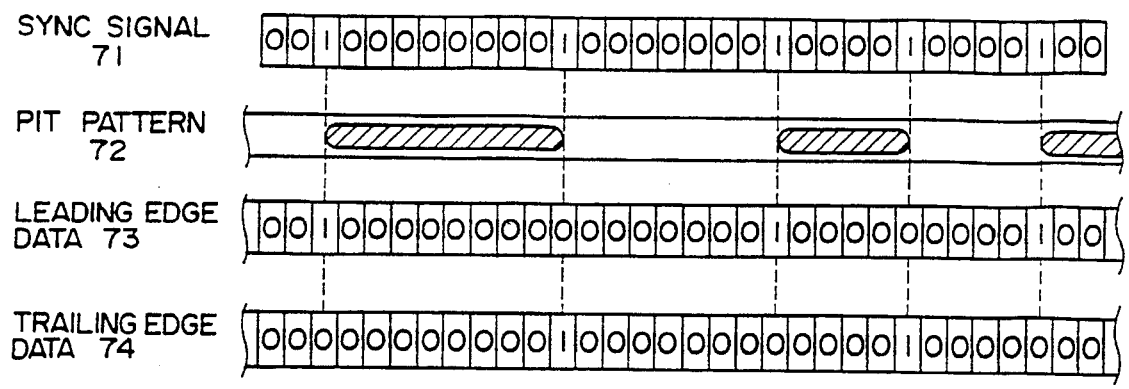
FIG. 12
FIG. 13
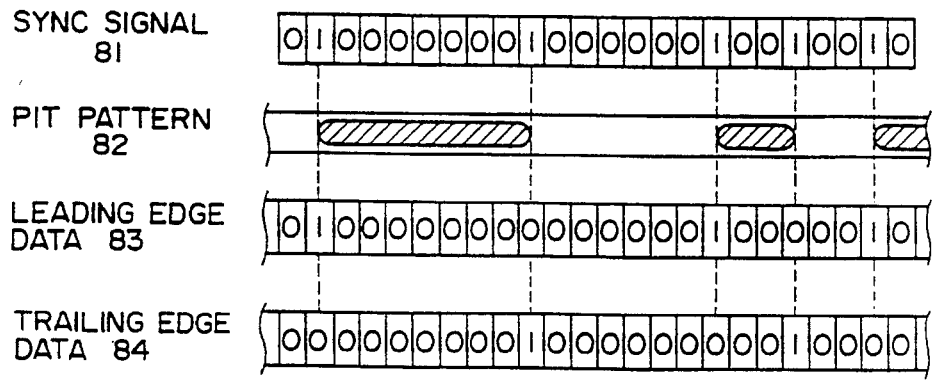

INFORMATION RECORDING/REPRODUCING DEVICE AND METHOD IN WHICH A RESYNCHRONIZATION SIGNAL IS INSERTED INTO THE DATA AT PREDETERMINED INTERVALS

This is a divisional continuation of U.S. patent application Ser. No. 07/991,469 filed on Dec. 15, 1992, Pat. No. 5,383,171, which is a continuation of U.S. patent application Ser. No. 07/588,361, filed on Sep. 26, 1990, Pat. No. 5,229,986.

BACKGROUND OF THE INVENTION

The present invention relates to a data recording/reproducing device for recording or reproducing data (information) by an edge recording method, and more particularly to a data recording/reproducing device capable of performing re-synchronization to correct synchronization on a data recording area.

In recent years, data recording by the so-called edge recording method, which is suitable for high density recording, has been adopted in the field of optical disk devices or the like.

The edge recording method is a data recording method which records or reproduces data in such a manner that the positions of a leading edge and a trailing edge of a pulse signal of a signal pulse are significant. More specifically, the edge recording method records or reproduces data in such a manner that the leading edge and trailing edge of each of the signal pulses obtained by converting data into a run-length limited code correspond to the edge positions of each of the status transition patterns or pits formed on a recording medium. In data reproduction by the edge recording method, it is important to have precise synchronization.

In data recording by the edge recording method, as the case may be, the interval (pit length) between the leading edge and trailing edge of each of the pits, which can be formed by irradiating an optical disk with laser light, does not have a desired length but varies owing to thermal capacitance of the recording medium, changes in a recording condition, etc. For example, if a pit is formed after a lengthy blank, the position of the leading edge can be displaced to a lagged position. If a blank is formed after a lengthy pit, the position of the trailing edge can be displaced to the lagged position. The presence of such displacement causes a change in the relative positional relationship between the leading edge data and the trailing edge data which are detected during reproduction, thus making it impossible to reproduce the recorded data accurately.

The above problem applies to the status transition pattern other than the pits, e.g., recording domains.

in order to solve such a problem, JP-A-62-8370 proposes a method which can absorb or correct deviations from the normal lengths of the recording pits which are due to the property of a recording medium or a change in the recording condition. In this method, in order to detect the deviation from the normal pit length, with the leading edge and trailing edge of the recording pit corresponding to the same demodulation pattern (SYNC pattern), a time difference between two SYNC pattern detection signals resulting from the leading edge and the trailing edge during reproduction is detected by a time difference detector circuit composed of a delay device having plural taps with a fixed delay time interval and a flip-flop.

This prior art, however, has the following defects. Namely, the prior art pays attention to the synchronization signal recorded at the position indicative of the start of an area where any information is recorded, but does not take into consideration re-synchronization in the same area. More specifically, a change in the pit length is detected and corrected only at the head of each sector. Thus, if the recording medium property or recording condition in the first half of the sector is different from that in the second half thereof, as described above, the pit length will vary to provide an appreciable deviation from its normal length, thereby providing an error in the detected signal. More disadvantageously, the error will persist owing to the nature of demodulation. To obviate this, it is essential to take have re-synchronization at any suitable position in a data area to stop the persistence of an error.

In this case, as described above, the time relationship between the signal reproduced from the leading edge of a pit or recording domain and that reproduced from the trailing edge thereof will shift undecidedly. The synchronization signal used to collate the time base of the former with that of the latter should be detected using either one of them. Further, it should be discriminatable as a synchronization signal in any data area where any information is to be recorded.

SUMMARY OF THE INVENTION

The present invention provides a data recording/reproducing device which has accurate re-synchronization in recording or reproducing data by an edge recording method.

The present invention accurate re-synchronization in the signals reproduced individually from the leading edge and the trailing edge of each of the pits formed as data on a recording medium.

The present invention further provides a synchronization signal code train which is not included in the conversion rule of a run-length limited code in recording or reproducing data in the run-length limited code.

The present invention can be accomplished in a device which records or reproduces data for a recording medium in correspondence between a code train in a predetermined code rule, e.g., a run-length limited code, and the positions of the leading edge and the trailing edge of each of status transition patterns such as pits. In recording data on the recording medium, a synchronization (sync) signal is inserted at regular intervals in the data converted in the run-length limited code to form status transition patterns such as pits in a data recording area of the recording medium. In this case, a signal which is not included in the conversion rule of the run-length limited code is adopted as the above sync signal.

On the other hand, in reproducing the data recorded in the manner described above, the signal detected from the recording medium is separated into a signal (leading edge data) corresponding to the leading edge of each status transition pattern and a signal (trailing edge data) corresponding to the trailing edge thereof, and also a reproduction clock in bit-synchronism with the respective data is formed. Using both sync signals detected from the leading edge data and the trailing edge data, particularly re-synchronization (re-sync) signals, the present invention recomposes the leading edge data and the trailing edge data into a reproduced data with a deviation in the relative positional relation therebetween corrected, and demodulates the above signal on the basis of the re-composed data. In this way, using the corresponding re-sync signals, the leading edge data and the trailing edge data separated from the detected signal are re-composed with the relative position relation adjusted so that influence of the deviation in the position relation between the leading edge and the trailing edge on the reproduced data can be removed, thereby performing accurate data reproduction.

In the case where sync signals are to be detected from the leading edge data and the trailing edge data, the sync signal located at the head of a sector can be easily discriminated from the signal indicative of data, whereas the re-sync signals inserted in the data at regular intervals cannot be easily discriminated from the data signal, thereby providing some fear of erroneous detection. In order to obviate such fear, the present invention adopts as the sync signal specially constructed code trains. The formats of sync signals which can be applied to the present invention are as follows.

(1) In the case where the combination of a first code train and a second code train in which the second code train with a minimum or maximum run-length in the run-length limited code follows immediately after the first code train with a maximum or minimum run-length is not included in the conversion rule for converting information into a run-length-limited code, as the sync signal, a sync signal which includes repetition of the second code train immediately after repetition of the first code train is used.

(2) In the case where the combination of code trains in which the code train with a minimum run-length in the run-length limited code follows immediately after the code train with a maximum run-length is not included in the conversion rule for converting information into a run-length limited code, as the sync signal, a sync signal which includes repetition of the above minimum run-length code train following immediately after the code train having a length equal to the repetition of maximum run-length code train and consisting of a code train longer than the maximum run-length code train in a front part and another code train shorter than it in a rear part is used.

(3) A first sync signal and a second sync signal are changed according to the status of the place immediately before the place where the sync signal is to be inserted. The first sync signal is not included in the conversion rule for conversion into the run-length limited code and has a first code train with an odd number of intermediate inverted code(s), e.g., logic '0's. The second sync signal is also not included in the conversion rule for conversion into the run-length limited code and has no intermediate inverted code or has an even number of inverted codes.

(4) The sync signal is equal, in the number of its inverted parts, i.e., logic '0's, to that in a code train in which code trains are combined to provide a maximum total run-length in the run-length limited code, and includes a code train longer than that code train.

(5) The sync signal is equal, in the number of its inverted parts, i.e., logic '0's, to that in a code train in which code trains are combined to provide a minimum total run-length in the run-length limited code, and includes a code train shorter than that code train.

The sync signal having the code format as described above can be discriminated to be a signal not including the conversion rule used for recording from the reproduced data corresponding to either the leading edge or the trailing edge of the status transition pattern of each of the pits or the like recorded on a recording medium. Therefore, the signal having such a code train can be surely detected as a sync signal from the signals indicative of any other information.

In most cases, with respect to the sync signal detected as the signal not included in the conversion rule into the run-length limited code, at least one of its leading edge data and trailing edge data has only to be detected as a unique code pattern discriminatable from other code patterns. This is because a deviation in the relative positional relationship between the leading edge data and the trailing edge data is generally relatively small so that detection of the unique code pattern from one of them suggests that another sync signal is present at the position before or after apart by a predetermined time from that detection position. Thus, the other sync signal detected has only to include the code pattern indicative of the sync signal.

The sync signal may be constructed using a code train where the leading edge and trailing edge of the train can be detected as a unique code pattern.

BRIEF DESCRIPTION OF THE DRAWINGS

FIGS. 3A and 3B are views showing sync signals which can be used in the present invention;

FIG. 5A-1 and FIG. 5A-2, is a waveform chart for explaining the operation of one embodiment of the data recording/reproducing device according to the present invention;

FIG. 11 is a view showing a still another example of the sync signal which can be used in the present invention;

FIG. 12 is a view for explaining the conversion rule of a 1–7 code;

FIG. 13 is a view showing an example of the sync signal using the 1–7 code; and

DETAILED DESCRIPTION

The present invention will be explained in connection with the optical disk recording/reproducing device to which the present invention can be applied.

Figure 1:
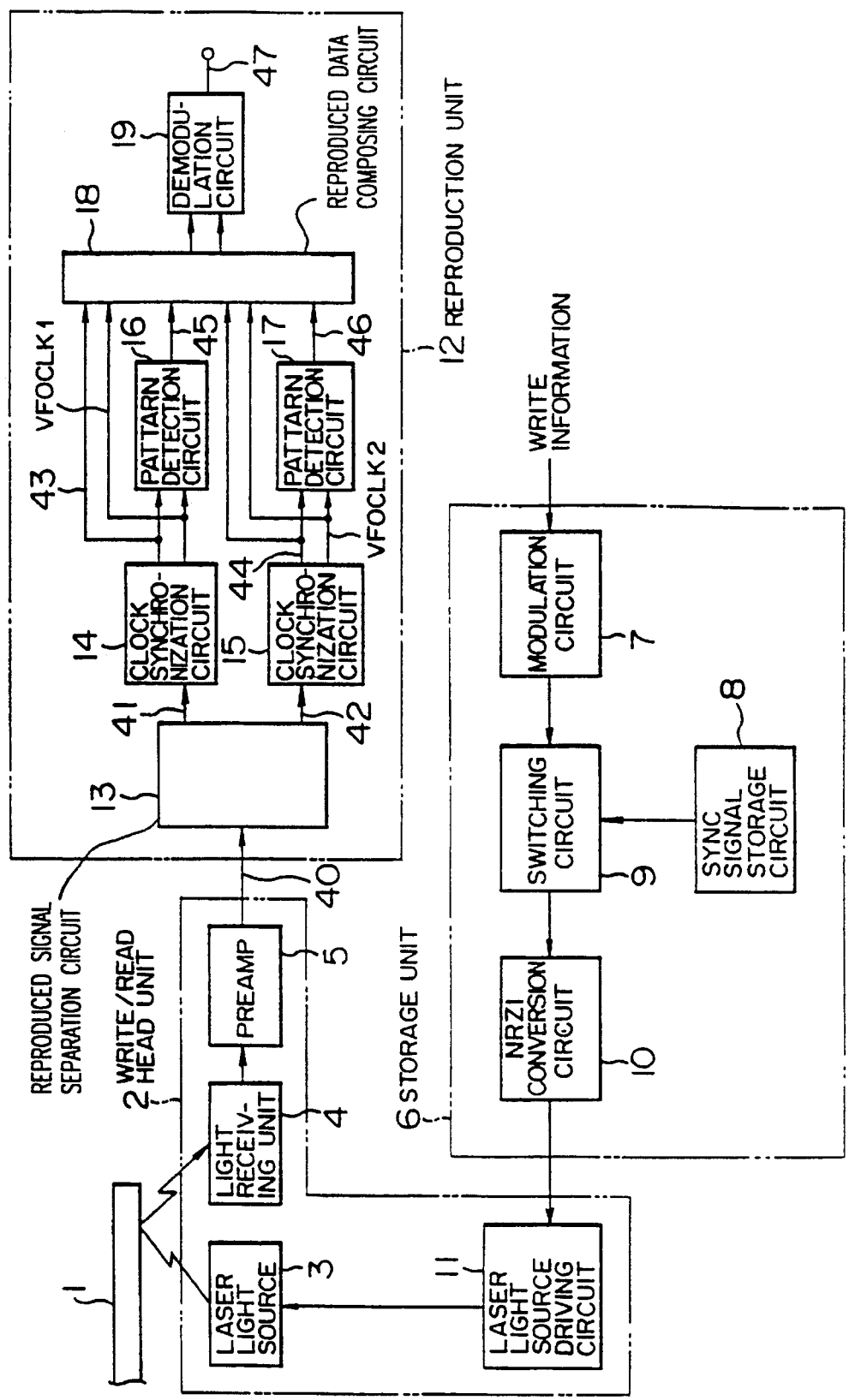
FIG. 1 is a block diagram of an arrangement of an optical disk recording/reproducing device according to one embodiment of the present invention.

FIG. 1 is a block diagram of the optical disk recording/ reproducing device according to the present invention. In FIG. 1, 1 is an optical disk on which data (information) are recorded in the form of pits. The optical disk recording/ reproducing device generally includes a read/write head 2 for reading or writing information, and a control unit (not shown) for controlling the entire device including driving of the read/write head 2 and rotation of the optical disk 1. The recording/reproducing device further includes: a recording or storage unit 6 for converting the information to be recorded or written into a signal to be recorded on the optical disk and supplying that signal to the read/write head 2; and a reproducing unit 12 for reproducing the information on the basis of the signal reproduced from the optical disk 1 by the head 2.

Now it should be noted that the arrangement according to this embodiment is divided as mentioned above only for convenience of explanation as in other embodiments, and may be sectioned in the other manner. Also it should be noted that the names such as the "read/write head" is labelled for convenience of explanation, and the arrangement of the data (information) recording/reproducing device is not limited by these names.

Recorded on the optical disk 1 are data in such a manner that mirror-like non-recorded areas are irradiated with light beams to form pits so that pit patterns indicative of status transitions corresponding to the lengths of the pits are formed. Data may be also recorded on an opto-magnetic disk by forming recording domains with different magnetization directions on the non-recorded areas of the opto-magnetic disk.

It should be noted that in this embodiment, the leading edge and the trailing edge of each of the status transition patterns, such as pits, correspond to the positions of '1' of the recorded data, namely to the inverted positions of '1' in the run-length-limited code.

The read/write head unit 2 is composed of a laser light source 3 for irradiating the optical disk 1 with a pulse-like light beam, a light receiving part 4 for detecting the signal of the light beam reflected from the optical disk 1, a pre-amplifier 5 for amplifying the signal detected by the light receiving part to produce the signal to be used for reproduction of information, and a circuit 11 for driving the laser light source 1. It should be noted that the preamplifier 5 also produces control signals for focusing control, tracking control, etc.

Further, the read/write head unit 2 is provided with necessary functions corresponding to the storing characteristics of the disk 1. For example, in the case of the opto-magnetic disk, the read/write head unit 2 is provided with a magnetic head for the read and write operations and a driving circuit to control the magnetic head (both not shown).

The recording unit 6 is composed of a modulation circuit 7 for converting the information to be recorded into the record data in the run-length-limited code in accordance with a predetermined conversion rule, e.g. 2–7 (two-to-seven) modulation, a sync signal storage circuit 8 for previously storing a sync signal to be inserted in the record data, a switching circuit 9 for inserting the stored sync signal in a predetermined position of the record data in accordance with a prescribed format, and an NRZI (non-return-to-zero-inverted) circuit 10 for NRZI-conversion of the record data.

The recording unit 6 and a part of the read/write head unit 2 constitute means for recording data on the recording medium. The sync signal storage circuit 8 and the switching circuit 9 constitute means for entering a sync signal.

The sync signal storage circuit 8 stores at least a sync signal (hereinafter also referred to as a RESYNC pattern) for re-synchronization (RESYNC) inserted every prescribed data length in the data area, and can also store another sync signal (hereinafter also referred to as a VFOSYNC pattern) for reproducing clock synchronization (VFOSYNC). Preferred examples of the RESYNC patterns will be described later.

The NRZI conversion circuit 10 is constructed, for example of a T (toggle) flip-flop circuit (not shown). Specifically, the NRZI conversion circuit 10 serves to invert the output level ('1' or '0') whenever '1' of the record data converted into the run-length-limited code is input to its input terminal, thereby NRZI converting an input data.

The reproduction unit 12 is composed of a reproduced signal separation circuit 13 for separating the reproduced signal detected by the read/write head unit 2 into a leading edge detection signal of the pulse corresponding to the leading edge position of the status transition pattern and a trailing edge detection signal of the pulse corresponding to the trailing edge position, clock synchronization circuits 14 and 15 for creating reproduction clocks for the above separated leading edge detection signal and trailing edge detection signal and also producing leading edge data and trailing edge data in synchronism with the created clocks, pattern detecting circuits 16 and 17 for detecting sync signals for re-synchronization for the leading edge data and the trailing edge data, respectively, reproduced data composing circuit 18 for composing the leading edge data and the trailing edge data using the synchronous signals for re-synchronization, and a demodulation circuit 19 for demodulating the composed reproduced data.

The read part of the read/write head unit 2 and the reproduction unit 2 constitute means for reproducing the data from the recording medium.

The reproduced signal separation circuit 13, the internal details of which are not shown, is constructed of a circuit for detecting the signal representing if the edge at issue is a leading edge or a trailing edge on the basis of the reproduced signal alternating between an H (high) level and a L (low) level, and a circuit for separating the signal indicative of the detected leading edge and that indicative of the detected trailing edge and outputting them.

The clock synchronization circuits 14 and 15, which are constructed of VFOs (variable frequency oscillators), respectively, produce reproduction clocks VFOCLK1 and VFOCLK2, and the leading edge data and the trailing edge data.

The pattern detecting circuits 16 and 17, which have the same circuit construction, include a circuit (not shown) for previously storing two kinds of RESYNC detection patterns for the input leading edge data and trailing edge data, and a circuit (not shown) for comparing the input leading (or trailing) edge data with the stored pattern and, if they agree with each other, produces a RESYNC detection signal.

Figure 5B:
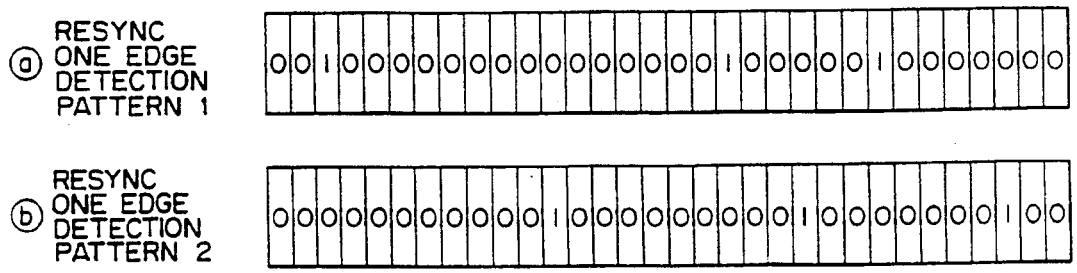
FIG. 5B is a view showing an example of a pattern for detecting the sync signal used in the embodiment of FIG. 5A, which includes FIG. 5A-1 and FIG. 5A-2.

As the RESYNC detection patterns, ones separated from a code train constituting a sync signal in such a manner that they have a bit of '1' disposed alternately and complimentarily, such as patterns 1 and 2 shown by a and b in FIG. 5B, for example, are used.

These patterns 1 and 2 are stored in both the pattern detecting circuits 16 and 17. This is because whether either of the input data to the pattern detecting circuits 16 and 17 is a leading edge data or a trailing edge data depends on the status of the pit pattern.

Although the pattern detecting circuits 16 and 17 in this embodiment serve to detect only RESYNC patterns, they may be constructed to detect also VFOSYNC patterns. This permits the VFO synchronization to be dealt with in the same manner as in this embodiment. This is also desirable rather than provision of another separate dedicated circuit for detecting the VFOSYNC patterns since the circuit can be partially shared and so simplified.

Figure 4:
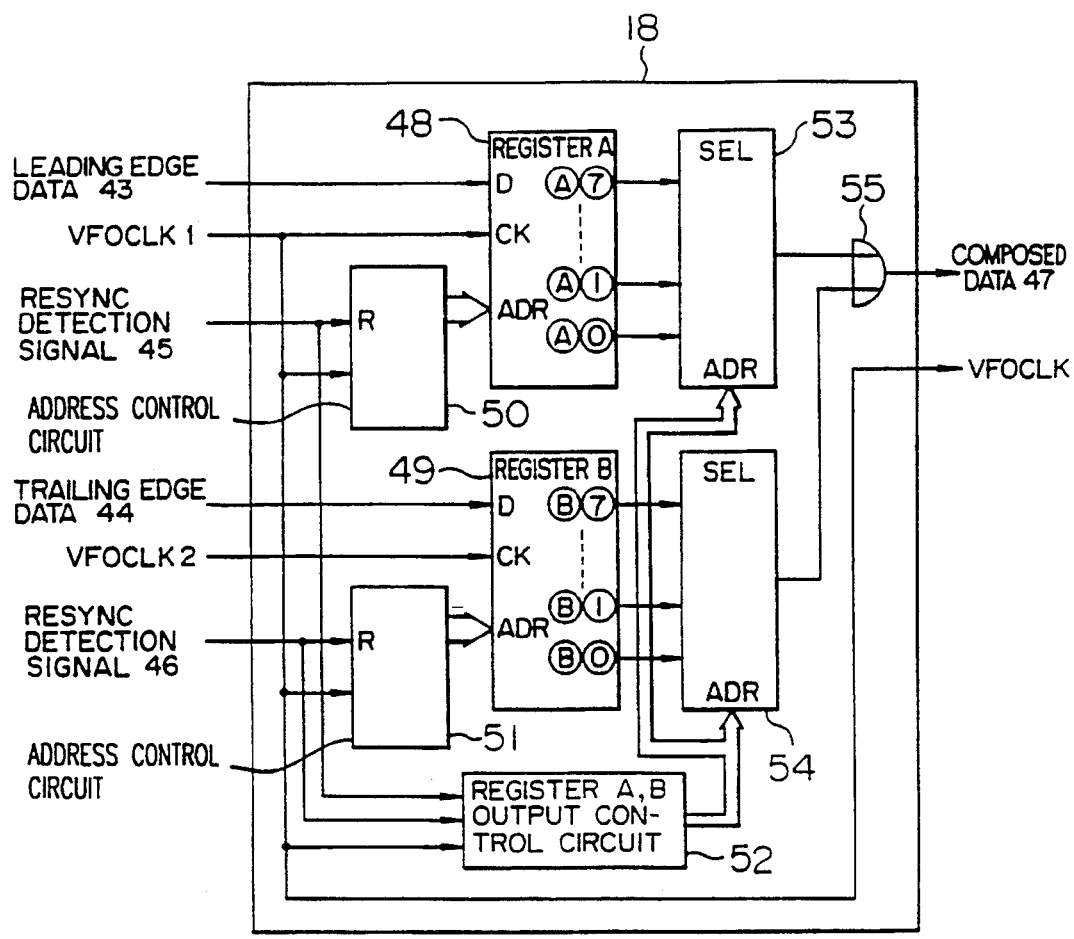
FIG. 4 is a block diagram of an example of a reproduced data composing circuit which is preferably used for the data recording/reproducing device according to the present invention.

The reproduced data composing circuit 18, as shown in FIG. 4, is made up of a register A48 for taking in leading edge data 43 in accordance with a reproduction clock VFOCLK1 and sequentially storing them at specified addresses; a register B48 for taking in trailing edge data 44 in accordance with a reproduction clock VFOCLK2 and sequentially storing them at specified addresses; an address control circuit 50, reset by the leading edge RESYNC detection signal 45, for sequentially setting addresses starting from address 0 to designate the addresses for register A48; and an address control circuit 51, reset by the trailing edge RESYNC detection signal 46, for sequentially setting addresses starting from address 0 to designate the addresses for register 49.

The reproduced data composing circuit 18 also comprises a selector 53 for sequentially taking in the contents of the register A48 from the designated address and serially outputting them; a selector 54 for sequentially taking in the contents of the register B49 in the same manner and serially outputting them; a register A, B output control circuit 52 for designating the same addresses for the selectors 53 and 54 using the reproduction clock VFOCLK1, the leading edge RESYNC detection signal 45 and the trailing edge RESYNC detection signal 46 and causing the selectors 53 and 54 to take simultaneously sequentially the storage contents of the registers A48 and B49; and an OR gate 55 for logic-ORing the outputs from the selectors 53 and 54 to compose the leading edge data and the trailing edge data.

The registers A48 and B49 constitute means for individually temporarily storing the leading edge data and the trailing edge data.

The address control circuits 50, 51, the selectors 53, 54, the register A, B output control circuit 52 and the OR gate 55 constitute means for composing data.

The reproduction unit 12 can correct a variation between the leading edge data and the trailing edge data for the VFOSYNC as well as RESYNC by constructing the pattern detecting circuits 16 and 17 so that they can detect the VFOSYNC patterns as well as the RESYNC patterns.

Further, using the fact that the position of RESYNC signal is set at regular intervals, the pattern detection circuits 16 and 17 may predict the position of the RESYNC signal to provide means for setting a gate. If pattern detecting circuits 16 and 17 are constructed so that the RESYNC signal can be detected only within the gated time, their erroneous detection can be prevented. The gate may be constructed in such a manner that it opens when the count of the reproduction clocks counted by a counter, which is triggered by a normally detected RESYNC signal, reaches the value approximately equal to the interval of inserting the RESYNC signal, and closes after a predetermined time.

Further, the reproduction unit 12 may be constructed to permit the reproduced data to be composed only when the RESYNC signals are detected in both pattern detection circuits 16 and 17.

Explanation will be given for an example of the sector format for composing the reproduced data.

Figure 14:
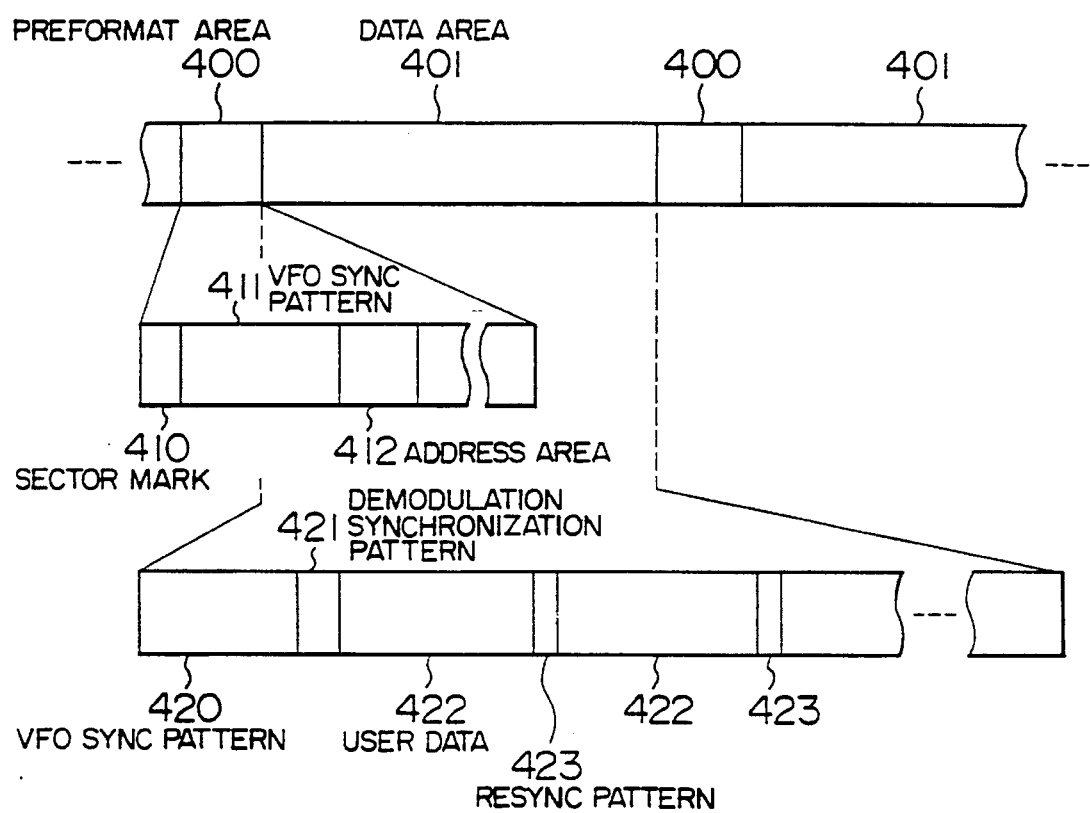
FIG. 14 is a view showing the format of the sector on a disk.

FIG. 14 shows the sector format formed on a certain track on the optical disk. The optical disk includes a large number of tracks previously formed in a spiral form for example. Each of the tracks is divided into plural (e.g., 64) blocks or sectors.

Each of the sectors is divided into a preformat area 400 and a data area 401. The preformat area 400 is further classified into a sector mark 410 indicative of the start of the sector, a VFOSYNC pattern 411 for creating reproduction clocks, an address area 412 where a track address and a sector address are recorded, etc.

User data are recorded within the data area 401. The format of the data area 401 is composed of a VFOSYNC pattern 420, a user data demodulation starting pattern 421, the user data 422 and RESYNC pattern for re-synchronization of the reproduction clock.

Now referring to FIGS. 2 to 3B, explanation will be given for an example of the RESYNC pattern.

Figures 2, 5A:
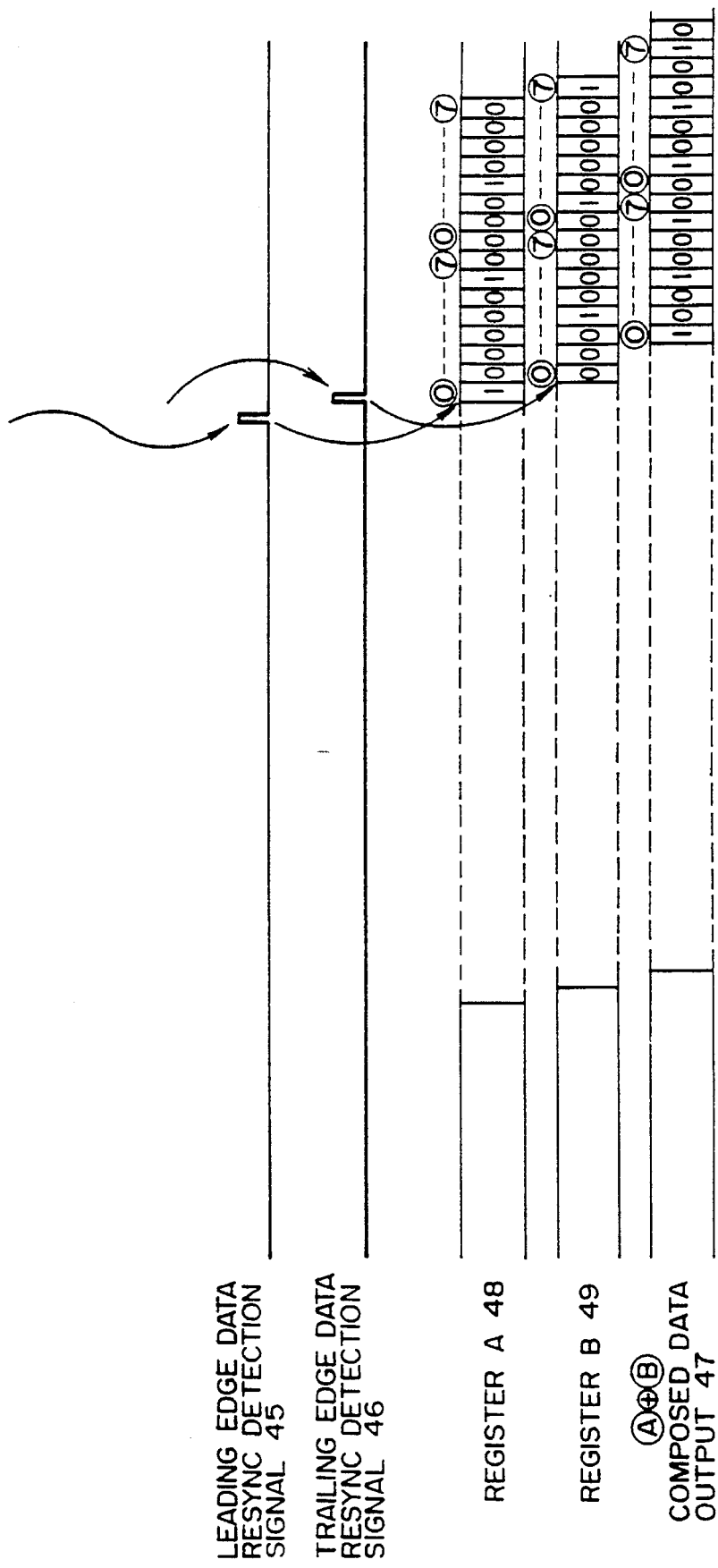
FIG. 2 is a view for explaining the conversion rule of a 2–7 code.
FIG. 5A, which includes

FIG. 2 shows a conversion rule of a 2–7 code which is an example of a run-length-limited code. Original data on the left side of FIG. 2 are converted into the code trains on the right side of the figure, respectively. As understood from any combination of the code trains in FIG. 2, the number of successive "0"'s between "1" and "1" is two in minimum and seven in maximum.

A code train which is not included in the conversion rule of FIG. 2 is the code train in which the code of only two successive "0"'s of the minimum run-length follows immediately after the code of seven successive "0"'s of the maximum run-length. The reason therefor is as follows. Each code train in FIG. 2 has two or three successive "0"'s in the last whereas the original data providing four successive "0"'s in the first is only "0011". Therefore, the code train having seven successive "0"'s is only the case where the code train "00001000" whose original data is "0011" follows immediately after the code train having three successive "0"'s in the last. However, the code train "0000100" has three successive "0"'s in the last. Thus, the code train in which only two successive "0"'s follow immediately after seven successive "0"'s cannot be formed by the conversion rule of FIG. 2.

As understood from the above description, an example of the synchronous signal constituting the RESYNC pattern may be a code including repetition of the code train in which the code of only two successive "0"'s of the minimum run-length follows immediately after the code of seven successive "0"'s of the maximum run-length.

An example of sync signal according to the above idea is shown in FIG. 3A.

The sync signal 24 shown in FIG. 3 includes a twice repeated code train of two successive "0"'s immediately after a twice repeated code train of seven successive "0"'s (arrow B), and its bit number is two bytes of the record data before the conversion into the run-length-limited code.

When the sync signal 24, after NRZI conversion, is recorded on the optical disk 1 in the form of pits, a pit pattern representative of status transitions is created. 29 to 31 denote length pits.

Further, the pit pattern 25 for the sync signal will be inverted in accordance with the state of the pit pattern immediately before the sync pattern 24 is inserted. Specifically, if any pit is extended in the region before the pit 29 in the pit pattern 25, of FIG. 3A then no pit will be located at the positions of the pits 29, 30 and 31 but instead pits are located between the pits 29 and 30, between the pits 30 and 31 and after the pit 31. Now, the case of the pit pattern 25 shown will be explained; if the pits are inverted, a leading edge data 26 and a trailing edge data 27 will be replaced by each other.

Outputs from the reproduced signal separation circuit 13 reading out the pit pattern 25 are the leading edge data 26 and the trailing edge data 27.

The leading edge data 26 includes 15 successive "0" from the first "1" (arrow D) to the second "1" (arrow E). However, the 2–7 code includes only 7 (seven) successive "0"'s in maximum so that it includes "1" of the trailing edge data 27 in the just middle from the first "1" (arrow D) to the second "1" (arrow E) of the leading edge data 26. Thus, it can be decided only from the leading edge data 26 that the sync signal 24 includes the twice repeated code of seven successive "0"'s.

Further, the leading edge data 26 includes 5 (five) successive "0"'s from the second "1" (arrow E) to the third "1" (arrow F). However, the 2–7 code includes only 2 (two) successive "0"'s in minimum so that it includes "1" in the trailing edge data 27 in the just middle from the second "1" to the third "1" of the leading edge data 26. Thus, it can be decided only from the leading edge data 26 that the sync signal 24 also includes the twice repeated code of two successive "0"'s.

Accordingly, it can be decided only by the leading edge data 26 that the sync signal 24 is a sync signal with a code train not included in the conversion rule into the 2–7 code in which only two successive "0"'s follows after seven successive "0"'s.

In the case where the pit pattern 25 as shown in FIG. 3A is inverted, the sync signal 24 can be detected from its trailing edge data 27.

In this way, it can be decided only by the leading edge data 26 or the trailing edge data 27 that the sync signal 24 as shown in FIG. 3A is a sync signal (resync pattern). It is needless to say that the sync signal 24 can be detected using both leading edge data and trailing edge data.

The reproduced data composing circuit 18 as shown in FIG. 1, in response to the fact that the sync signal 24 has been detected, composes the leading edge data 26 and the trailing edge data 27 delayed so that the respective "1"'s are located at predetermined (registered as a sync signal) positions of the time base.

Explanation will be given for a further improved pattern of the sync patten of FIG. 3A.

Laser light is used in order to create pits of recording domains on the optical disk 1. For this reason, if the place where seven successive "0"'s continue is a pit or a recording domain, that place will be irradiated with the laser light for a relatively long time. Thus, its circumference will be warmed so that the resultant pit or recording domain having a larger size than the required size could be created.

Specifically, if the place between "1" indicated by arrow A and "1" indicated by arrow B in the sync signal 24 shown in FIG. 3A constitutes a pit or recording domain, the trailing edge of the pit (recording domain) corresponding to "1" indicated by arrow B can slightly lag so the pit can also be slightly extended. Also, the leading edge of pit (recording domain) corresponding to "1" indicated by arrow C can slightly precede.

As a result, the place between "1" indicated by arrow B and "1" indicated by arrow C, which is not a pit (recording domain), will be slightly shortened. This can make it impossible to reproduce "1"'s indicated by arrows B and C. The reproduction of "1"'s indicated by arrows B and C can be assured by reducing the recording density so that the distance between "1" and "1" is much longer than the degree shortened owing to warming by the laser light.

However, reducing the recording density is not desirable for the sync signal. The recording density should be determined considering if the code train in which 3 (three) successive "0"'s follows after 7 (seven) successive "1"'s, the most difficult to reproduce in the conversion rule into the 2–7 code included in the data to be recorded, can be reproduced. Also, the sync signal should be patterned so that it can be reproduced with that recording density.

To this end, the pattern as shown in FIG. 3B is proposed. This pattern intends to prevent the above short non-pit place from being further shortened owing to partial temperature increase in the optical disk by irradiation of the laser light to make it impossible to be reproduced.

In FIG. 3B, 24 is the sync pattern code train constituting a resync pattern, 25 is a pit pattern on the optical disk corresponding to the sync signal 24, 28 to 31 are pits, and 26 and 27 are a leading edge data and a trailing edge data obtained by reproducing the pit pattern 25.

In the sync signal shown in FIG. 3B, the position of "1" indicated by arrow A in the sync signal shown in FIG. 3A is shifted to the position of "1" indicated by arrow A2.

Thus, 6 (six) successive "0"'s continue before the code consisting of 2 (two) successive "0"'s. The code train thus formed can be realized by the conversion rule shown in FIG. 2. Therefore, it can be reproduced without reducing the recording density.

Even if the place corresponding to 8 (eight) successive "0"'s constituting before the code consisting of 6 (six) successive "0"'s, which is a pit, is partially warmed so as to slightly enlarge the size of the pit, any problem does not occur since the subsequent 6 successive "0"'s have only to be reproduced.

The trailing edge data obtained by reproducing the sync signal 24, recorded in the form of the pit pattern 25, is equivalent to the leading edge data 26 as shown in FIG. 3A. Therefore, as described in connection with the sync signal shown in FIG. 3A, it can be detected that the signal (resync pattern) not existing in the conversion rule into the 2–7 code.

Also in the case of FIG. 3B, the pit pattern 25 may be inverted. Then, it can be decided from the leading edge data 26 that the sync signal 24 is a sync signal. In this way, the sync signal 24 as shown in FIG. 3B can be detected as a sync signal only from the leading edge data 26 or the trailing edge data 27, and also it is not necessary to reduce the recording density.

Now referring to FIGS. 5A and 5B as well as the respective figures explained above, explanation will be given for the operation of this embodiment. It should be noted that the explanation will be mainly made on the resync operation.

First, the operation of recording information (data) will be explained.

As seen from FIG. 1, the information to be recorded or written is input to the modulation circuit 7. The modulation circuit 7 converts the input information into a run-length-limited code (a 2–7 code in this embodiment) on a predetermined conversion rule. The information converted into the run-length-limited code is input to the NRZI circuit 10 via the switching circuit 10.

Whenever "1" enters the NRZI circuit 10, its output is inverted to be NRZI-converted. The information converted into the run-length-limited code and NRZI-converted is converted into a laser light pulse by means of a laser light source driving circuit 11 and the laser light source 3. Thus, as seen from FIG. 5A, in accordance with a write signals 38, the pits or recording domains as shown by a pit pattern 39 are created and recorded on the optical disk 1.

As shown by the format 36 in FIG. 5A, a sync signal is inserted in the recorded information at its predetermined regular intervals. Specifically, the sync signal, which is a predetermined code train (shown in FIG. 3B) previously stored in the memory 8, is inserted in the information to be recorded via the switching circuit 9 at regular intervals (e.g., 20 bytes) and input to the NRZI conversion circuit 10 with the information. During this operation, the operation of the conversion circuit 7 and inputting of the information to be recorded are stopped.

In this way, the information and the sync signals are recorded on the optical disk 1.

The operation of reproducing the recorded information will be described below.

The laser light whose intensity is lower than it is in the recording is emitted from the laser light source 3 and radiated to the optical disk 1. The light receiving unit 3 detects the intensity of the reflection light or the rotation of the polarized light surface due to the presence of the pit (recording domain) on the optical disk 1. The detected signal is amplified by the preamplifier 5, and a reproduced signal 40 is produced and sent to the reproduced signal separation circuit 13.

The reproduced signal separation circuit 13 generates a leading edge detection signal and a trailing edge detection signal from the rising edge and the falling edge of the signal produced from the light receiving unit 4, respectively. The leading edge detection signal 41 and the trailing edge data 42 enter the clock synchronization circuits 14 and 15, respectively. The corresponding leading edge data 43 and trailing edge data 44 are sent to the reproduced data composing circuit 18 and the pattern detection circuits 16 and 17 together with the clock signals VFOCLK1 and VFOCLK2 in synchronism with the respective detection signals 41 and 42.

The pattern detection circuits 16 and 17 compare the leading edge data 43 with the RESYNC on-edge detection pattern 1, and the trailing edge data 44 with the RESYNC one-edge detection pattern 45, respectively (both one-edge patterns are shown in FIG. 5B). The pattern detection circuit 16 produces a RESYNC detection signal 45 for the leading edge data 43 when the part a of the leading edge data as shown in FIG. 5A agrees with the detection pattern 1. Likewise, the pattern detection circuit 17 produces a RESYNC detection signal 46 for the trailing edge data 44 when the part b of the trailing edge data as shown in FIG. 5A agrees with the detection pattern 2.

These RESYNC detection signals 45 and 46 are sent to the corresponding address control circuit 50 and 51, respectively (FIG. 4) to reset them at their input timings. Thus, since in the state as shown in FIG. 5A, the RESYNC detection signal 45 is output earlier than the RESYNC detection signal 46, the address control circuit 50 is reset earlier than the address control circuit 51. Therefore, first, the address control circuit 50 produces successively the addresses from address 0 in accordance with the reproduction clock VFOCLK1. Next, the address control circuit 51 produces successively the addresses from address 0 in accordance with the reproduction clock VFOCLK1.

The register A48 stores the leading edge data 43 after the RESYNC pattern at the address designated by the address control circuit 50 in synchronism with the reproduction clock VFOCLK1. A little later, likewise, the register B49 stores the trailing edge data at the designated address in synchronism with the reproduction clock VFOCLK2.

In terms of the common addresses produced by the register A, B output control circuit 52, the selectors 53 and 54 read out simultaneously the data from the same address of the corresponding registers A48 and B49 and send the read data to the OR gate 55 to be composed.

Thereafter, the address control circuits 50 and 51 cyclically produce addresses until next RESYNC detection signals 45 and 46 are received. The registers A48 and B49 successively store the leading edge data 43 and the trailing edge data 44, for data composition, respectively.

As described above, in this embodiment, the RESYNC pattern is detected by only the edge of each of the leading edge data 43 and the trailing edge data 44. Therefore, even if there is some change in the distance between the leading edge and the trailing edge in the pit pattern, less change in the distance between the leading edges or between the trailing edges results. Thus, the positions of the edges in the pit pattern can be precisely detected. Further, in accordance with this embodiment, relative deviation in the positions of the encoded bits between the leading edge data 43 and the trailing edge data 44 is corrected by taking a logical sum of the leading edge data 43 and the trailing edge data 44 which are once stored in the registers A48 and B49 as buffers and simultaneously outputted in their bit-correspondence.

Explanation will be made on other embodiments of the sync signal which can be used in the present invention, and another embodiment of the optical disk recording/reproducing device which is suitable to use such sync signals. The same construction and operation as described previously will not be explained.

Figure 6:
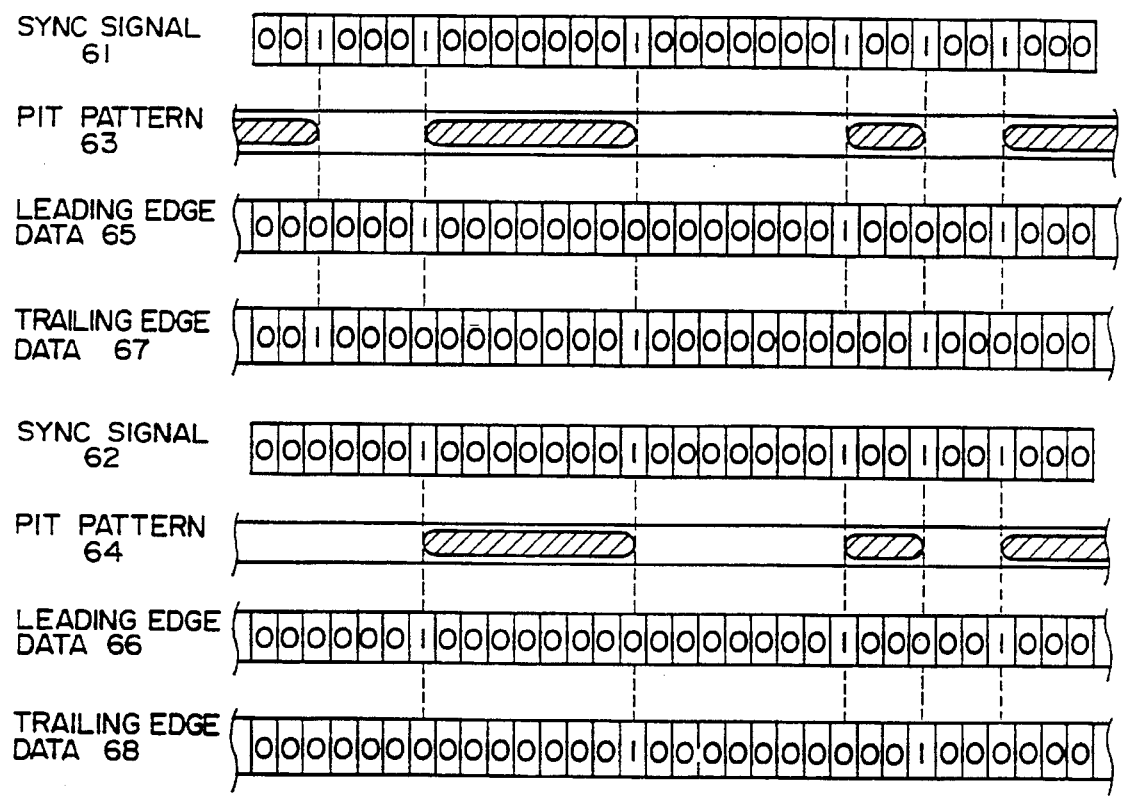
FIG. 6 is a view showing another example of the sync signal which can be used in the present invention.

FIG. 6 shows formats of two kinds of sync signals 61 and 62, the corresponding pit patterns, leading edge data and trailing edge data.

The sync signals 61 and 62 shown in FIG. 6 are changed in accordance with the presence of a pit at the position immediately before the sync signal at issue is inserted. Specifically, if there is a pit (recording domain) created on an optical disk at the position immediately before the sync signal is inserted, sync signal 61 is recorded. If there is not a pit at that position, sync signal 62 is recorded.

The sync signal 61 is different from the sync signal 62 in that "1" is located at the third bit position. If the pit (recording domain) is created at the position immediately before the sync signal is inserted, creation of the pit is ceased by the third bit "1".

Both sync signals 61 and 62 include a code train in which two successive "0"'s are twice repeated immediately after seven successive "0"'s are twice repeated, as shown in FIG. 3A. However, the presence of the pit (recording domain) corresponding to the above code train is fixed irrespective of the state immediately before the sync signal is inserted, as illustrated by the pit patterns 63 and 64 shown in FIG. 6.

Therefore, unlike the sync signal shown in FIG. 3A, the pit patterns 63 and 64 do not become by any means a pit pattern in which the pit (recording pattern) is located at the place where seven successive "0"'s continue immediately before the code consisting of two successive "0"'s.

Further, it can be decided from the state where five "0"'s continue after fifteen "0"'s continue that the sync signal 61 or 62 is a code train not including the conversion rule into a run-length-limited code (2–7 code), i.e., a sync signal, as described in connection with FIG. 3A.

Further, in the sync signals 61 and 62 shown in FIG. 6, the state where five "0"'s continue after fifteen "0"'s continue appears only in the leading edge data 65 and 66. The pattern detection circuit for detecting the sync signal has only to be provided only on the side of the leading edge data.

Explanation will be made of an embodiment of the optical disk data recording/reproducing device which is suitable to record/reproduce data using the above sync signals 61 and 62 as RESYNC patterns.

Figure 7:
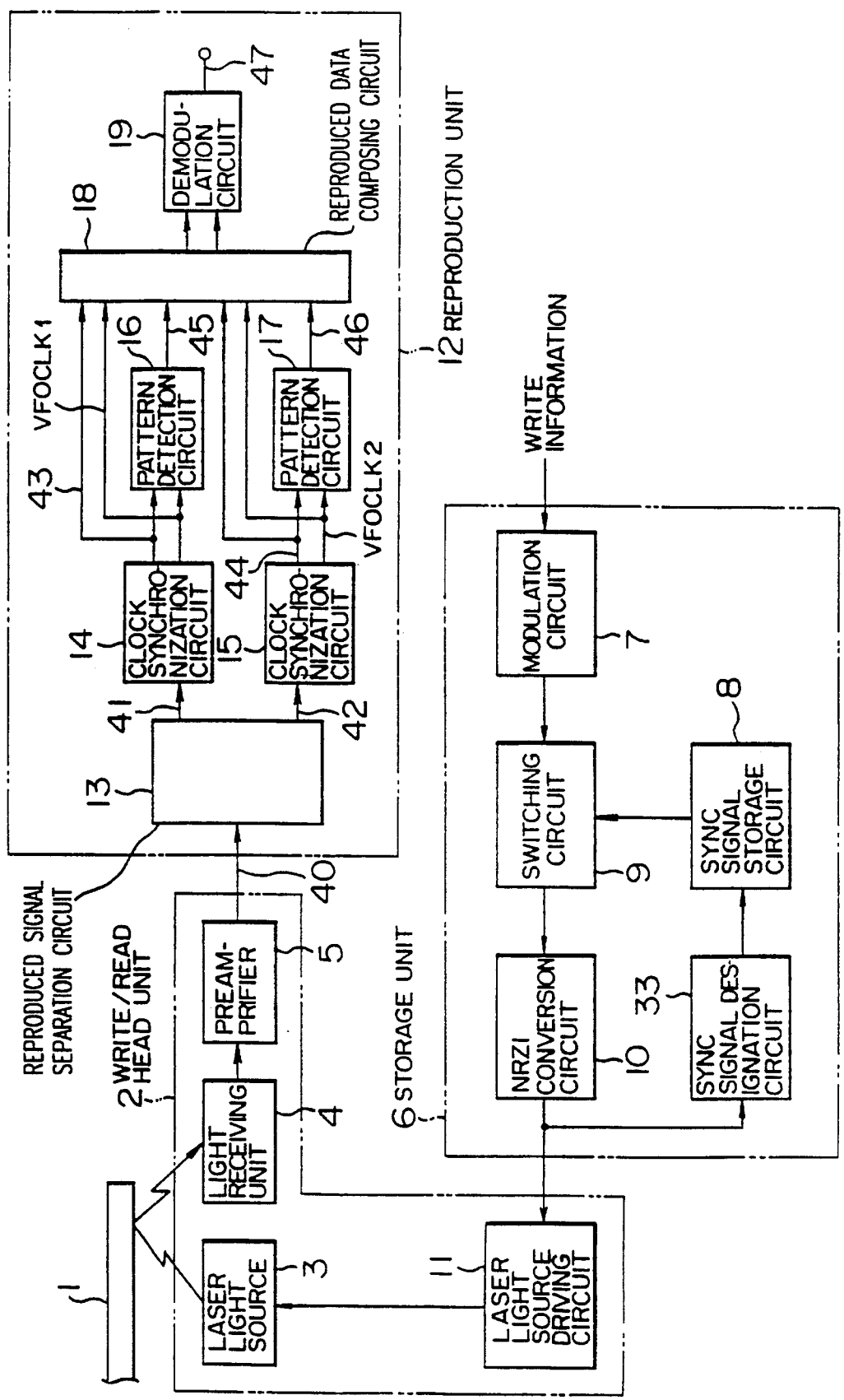
FIGS. 7 and 8 are block diagrams of other embodiments of the optical disk recording/reproducing device which can preferably use the sync signal as shown in FIG. 6, respectively.

FIG. 7 is a block diagram of the arrangement of such as optical disk data recording/reproducing device. This optical disk recording/reproducing device, as in the device as shown in FIG. 1, an optical read/write head unit 2 used to record/reproduce information for an optical disk 1, a recording (storage or writing) unit 6 for supplying the data to be written to the optical head unit 2, and a reproduction unit 12 for reproducing the information from the signal detected by the optical head unit 2.

In FIG. 7, like reference numerals refer to like parts in FIG. 1 so that the differences therebetween will be mainly explained.

The optical head unit 2 is made up of, in the same arrangement as FIG. 1, the laser light source 3, the light receiving unit 4, the preamplifier 5 and the laser light source driving circuit 11.

The recording (writing) unit 6 is made up of, in the same arrangement as FIG. 1, a sync signal designation circuit 33 as well as the modulation circuit 7, the sync signal storage circuit 8, the switching circuit 9 and the NRZI conversion circuit 10.

The storage circuit 8 stores the sync signals 61 and 62 having the patterns as shown in FIG. 6 as RESYNC patterns. The storage circuit 8 can store VFOSYNC patterns as described in connection with FIG. 1.

The sync signal designation circuit 33 detects the output from the NRZI conversion circuit immediately before the sync signal is inserted to select one of the sync signals 61 and 62 as an output of the storage circuit 8 according to whether pit (recording domain) is produced immediately preceding the sync signal or not.

Figure 9:
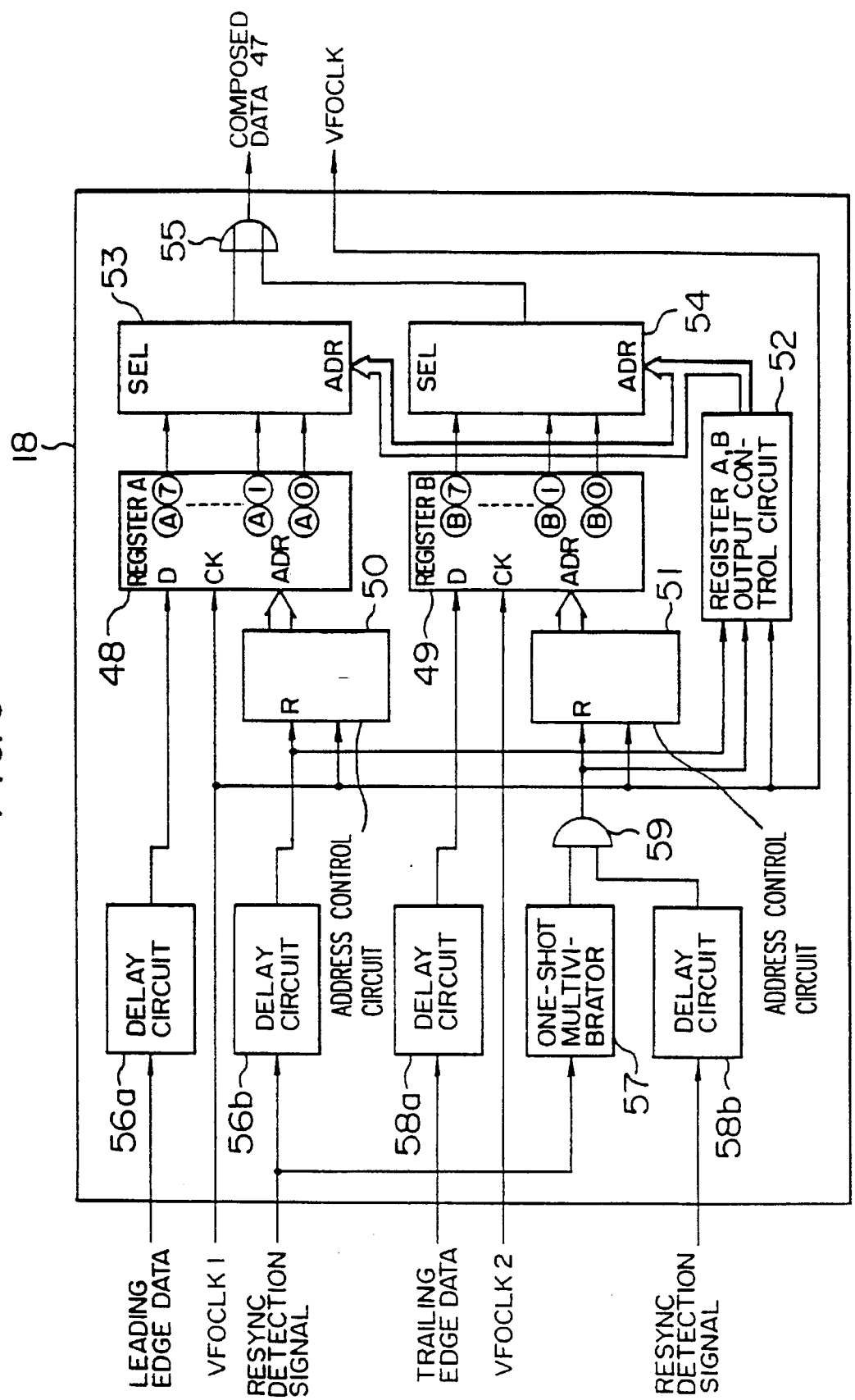
FIG. 9 is a block diagram of one embodiment of the reproduced data composing circuit which can be preferably used for the optical disk recording/reproducing device as shown in FIGS. 7 and 8.

The reproduction unit 12 is made up of, in the same arrangement as FIG. 1, a reproduced signal separation circuit 13, clock synchronization circuits 14, 15, pattern detection circuits 16, 17, the reproduced data composing circuit 18 and the demodulation 19. However, as seen from FIG. 9, the reproduced data composing circuit 18 is different, from that FIG. 4 in that shown in a delay circuit 56b is added as a stage to precede the address control circuit 50; a one-shot multivibrator 57, a delay circuit 58 and an AND gate 59 are added as a stage to precede the address control circuit 51; and further delay circuits 56a and 58a are added as a stage to precede registers A48 and B49, respectively.

This is because the two kinds of sync signals 61 and 62 as shown in FIG. 6 are used so that the leading edge data permits the RESYNC pattern discriminatable from the other data to appear whereas the trailing edge data only permits the RESYNC pattern to be detected but does not permit it to be surely discriminated from the other data.

In this embodiment, the delay circuits 56a, 56b, 58a and 58b perform the delay operation by the same time in synchronism with the resync clocks, respectively. The one-shot multivibrator 57 produces a pulse having the pulse width which is longer than the above delay time.

In such an arrangement, the leading edge data and the trailing edge data are output from the corresponding delay circuits 56a and 58a in their delayed state by the same time at the corresponding input timings. Also, the leading edge data RESYNC detection signal and the trailing edge data RESYNC detection signal are also output from the corresponding delay circuits 56b and 58b in their delayed state.

Now when the leading edge data RESYNC detection signal is input in the state deviated before or after input of the trailing edge data RESYNC detection signal, the one-shot multivibrator 57 produces a pulse. Therefore, the logical product of this pulse and the output from the delay circuit 58b taken by the AND gate 59 will consider the trailing edge data RESYNC detection signal to be correct.

The RESYNC detection signal is produced also when the data having the same pattern as the RESYNC pattern is detected by the pattern detection circuit 17. However, in this case, the leading edge data RESYNC detection signals are not before and after the data so that this RESYNC detection signal is stopped by the AND gate 59 thereby to prevent the rear stage address control circuit 51 from being reset.

Further, all the leading edge data, the trailing edge data and their RESYNC detection signals are delayed by the same time so that relative deviation between the leading edge data and the trailing edge data is held as it is, which will be corrected by the rear stage registers A48 and B49. This correction operation is the same as in the embodiment described in connection with FIG. 1.

The device according to this embodiment operates in the same way as that described in connection with FIG. 1 except the differences described above, thereby recording the information including the sync signals 61 and 62 as shown in FIG. 6 as RESYNC patterns on the optical disk 1 and reproducing it therefrom.

Figure 8:
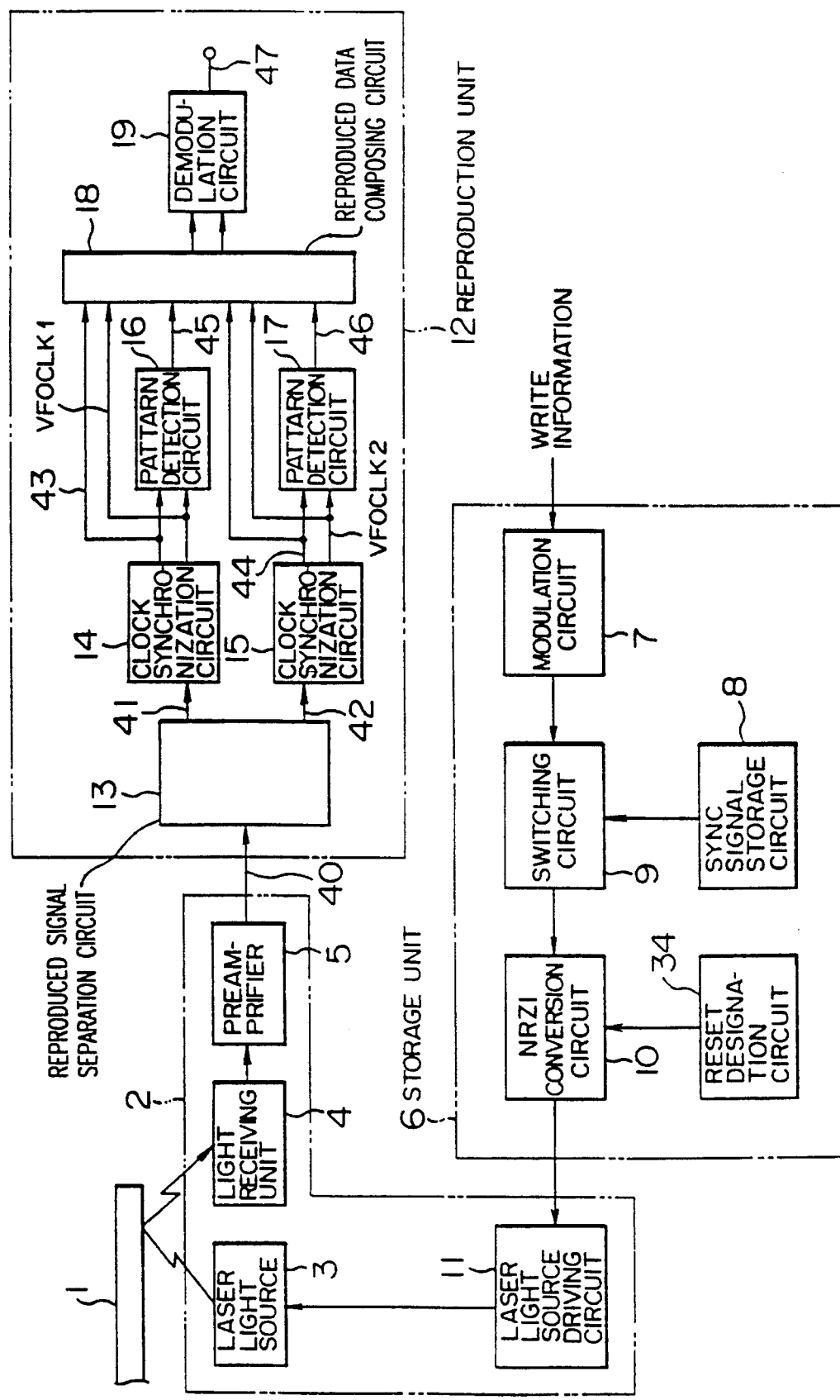

Referring to FIG. 8, explain will be given for another embodiment of the optical disk recording/reproducing device which is suitable to use the above sync signals 61 and 62 as RESYNC signals.

The device according to this embodiment, which is made up of an optical disk 1, an optical read/write head unit 2, a recording (writing) unit 6 and a reproduction unit 12, is constructed and also operates in the same way as the device described in connection with FIG. 7 although it is partially different from the latter in the detailed arrangement of the recording unit 6 and the reproduced data composing circuit 18. Only the differences will be described below.

The recording unit 6 in this embodiment is made up of a reset designation circuit 34 as well as the modulation circuit 7, the sync signal storage circuit 8, the switching circuit 9 and the NRZI conversion circuit 10.

In this embodiment, the storage circuit 8 stores only the sync signal 62 as shown in FIG. 6 as a RESYNC pattern. It is needless to say that the storage circuit 8 may also store the VFOSYNC patterns.

The reset designation circuit 34 serves to designate reset for the NRZI conversion circuit 10 at the third bit position starting from the insertion of the sync signal 52 by the switching circuit 9. Thus, if the output from the NRZI conversion circuit 10 is in the state of indicating creation of a pit (recording domain), the NRZI conversion circuit 10 is reset thereby to cease the creation of the pit (recording domain). This has the same meaning as that the sync signal 61 is recorded as a sync signal. On the other hand, if the above output is not in that state, the output does not change by resetting the NRZI conversion circuit 10. Thus, the sync signal 62 is recorded as a sync signal.

In this way, the sync signal 61 or 62 recorded as a RESYNC pattern in a manner of changing them can be detected as a sync signal only by its leading edge data. Therefore, the pattern detection circuits according to this embodiment can be simplified as compared with the case of recording the sync signal as shown in FIG. 3A or 3B.

Further, recording the sync signal shown in FIG. 3A may require reducing the recording density as the case may be, whereas recording the sync signal 61 or 62 in a manner of changing them does not require reducing the recording density.

Figure 10:
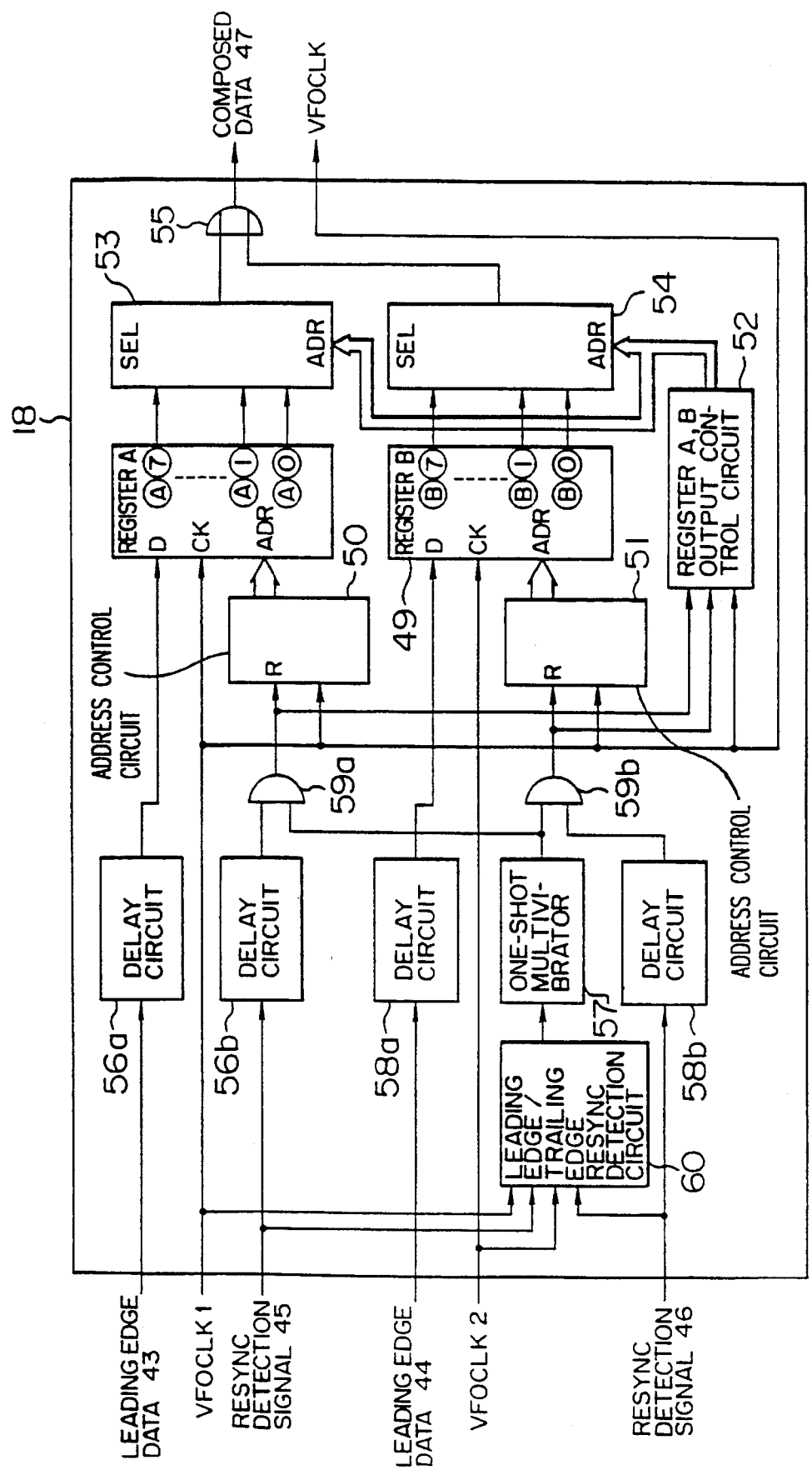
FIG. 10 is a block diagram of another embodiment of the reproduced data composing circuit which can be preferably used for the recording/reproducing device according to the present invention.

Now referring to FIG. 10, explanation will be made on an embodiment of the reproduced data composing circuit which is preferably used for the reproduction unit of the data recording/reproducing device in which a RESYNC pattern is detected by a leading edge data and/or a trailing edge data, as in the embodiment shown in FIG. 1.

The reproduced data composing circuit 18 according to this embodiment, like the circuit 18 shown in FIG. 4, is made up of address control circuits 50, 51, registers A48, B49, the register A, B output control circuit 52, selectors 53, 54, and the OR gate 55. These components will not be explained here since they have been already described.

The reproduced data composing circuit 18 according to this embodiment is made up of, as its characteristic components, delay circuits 56a, 56b, 58a and 58b which provide the same delay time, a one-shot multivibrator 57 which produces a pulse having a pulse width longer than the delay time, AND gates 59a and 59b, and a leading/trailing edge RESYNC detection circuit 60, in response to the RESYNC detection signals for the leading edge data and the trailing edge data which are received within a fixed time difference, produces a leading/trailing edge RESYNC detection signal to activate the multivibrator 57.

The leading edge data RESYNC detection signal 45 passing through the delay circuit 56b is ANDed with the output pulse from the one-shot multivibrator 57 in the AND gate 59a. Likewise, the trailing edge data RESYNC detection signal 46 passing through the delay circuit 58b is ANDed with the output pulse from the one-shot multivibrator 57 in the AND gate 59b. Thus, only if the RESYNC detection signals are detected for both leading edge data and trailing edge data, these detection signals 45 and 46 are valid.

Therefore, even if the RESYNC pattern is erroneously detected on the side of the leading edge or the trailing edge, an erroneous resync operation can be prevented. Particularly, if the RESYNC which is not necessarily unique appears on either side of the leading edge data and the trailing edge data, the reproduced data composing circuit 18 according to this embodiment is preferably used.

Specifically, if it can be decided that the SYNC pattern includes the code train not existing in the conversion rule into the run-length-limited by either leading edge data or trailing edge data in accordance with the status transition pattern (pit pattern), even if this fact cannot be decided by the other edge data, the re-synchronization can be carried out by use of the reproduced data composing circuit according to this embodiment.

Incidentally, the reproduced data composing circuit which can be used in the present invention should not be limited to those proposed in the embodiments previously described and in this embodiment. For example, the arrangement using FIFO memories in place of the registers may be adopted. In short, any circuit construction may be adopted as long as the relative position between the leading edge data and the trailing edge data can be corrected.

Other examples of the sync signal which can be used for the present invention will be described below.

The sync signal shown in FIG. 11 adopts a 2–7 code, as a run-length-limited code.

With the number of "1"'s being fixed to 3 in the 2–7 code, the longest total run-length is provided by the following code train:

"10000000100000001"

The sync signal shown in FIG. 11 includes a code train

"100000000100000001"

This code train is longer than the sync signal of FIG. 3A in which seven successive "1"'s are twice repeated in the 2–7 code since it includes an equal number of "1"'s to, but a larger number of "0"'s by one than the latter.

The leading edge data 73 (trailing edge data as the case may be) obtained when reproducing the code train recorded on the optical disk as shown in FIG. 11 includes the state where 16 (sixteen) successive "0"'s continue. Therefore, this recorded sync signal includes the code consisting of 8 (eight) successive "0"'s not existing in the 2–7 code conversion rule so that it can be discriminated from the other code train due to the 2–7 code conversion rule.

The pit pattern 72 shown in FIG. 11, like the pit pattern as shown in FIGS. 3A and 3B, may be inverted in accordance with the state immediately before the sync signal is inserted. However, the sync signal of FIG. 11 includes the code consisting of 3 (three) or more successive "0"'s following after the code consisting of 7 (seven) or more successive "0"'s. Therefore, using the sync signal as shown in FIG. 3A may be required to reduce the recording density whereas using the sync signal of FIG. 11 is not required to reduce it by any means.

Incidentally, in accordance with the same idea as illustrated in FIG. 11, it is possible to use a code train in which the number of inversions, i.e., "1", is equal to that in the combined code train providing the minimum total run-length in the run-length-limited code and whose length is shorter than the latter code train.

Although the sync signal described above uses the 2–7 code, the other run-length-limited code can be used in the present invention in accordance with the same idea.

FIG. 12 shows the conversion rule into a 1–7 (one to seven) code.

The bits indicated by x in the code train of FIG. 12 depend on the value of the previous bit when being combined with the other code train. If the previous bit is "1", x is "0", and if the previous bit is "0", x is "1".

In the 1–7 code, the number of "0"'s between "1" and "1" is set for 1 to 7, and also two bits of the data are converted into three bits in the code train.

FIG. 13 shows an example of the sync signal in the form of the 1–7 code.

This sync signal is constructed in the same manner as the sync signal in the form of the 2–7 code as shown in FIG. 1. With the number of "1" set for 3 (three), the most longest total run-length is provided by the following code trains a. "100000010000001"
b. "100000001000001"
c. "100000100000001"

The sync signal 81 shown in FIG. 13 includes the code train

"1000000010000001"

This code train is longer than the above code trains a to c since it includes an equal number of "1"'s to but a larger number of "0"'s by one than the latter code trains.

The leading edge data 83 (trailing edge data 84 as the case may be) obtained when reproducing the code train recorded on the optical disk as shown in FIG. 13 includes the state where 14 (fourteen) successive "0"'s continue. Therefore, the sync pattern recorded includes a combination of 7

(seven) successive "0"'s and 6 (six) successive "0"'s with "1" intervening therebetween or a code train consisting 8 (eight) or more successive "0"'s which is a code train not existing in the conversion rule into the 1–7 code. Thus, it can be decided that this pattern is a sync signal.

The pit pattern 82 shown in FIG. 13, like the pit pattern as shown in FIG. 11 may be inverted in accordance with the state immediately before the sync signal is inserted. In this case, the 1–7 code includes a code train in which only one "0" follows immediately after 7 (seven) successive "0"'s. Therefore, using the code train in which only 2 (two) "0"'s follow after 6 (six) successive "0"'s as shown in FIG. 13 is not required to reduce the recording density unlike using the 2–7 code described in connection with FIG. 3A.

The code trains of the sync signals hitherto described are exemplary. The present invention should not be limited to these code trains and can use the other code trains in accordance with the same idea.

In the embodiments shown in FIGS. 1, 7 and 8, serial data are dealt with. The present invention, however, should not be so limited. For example, the reproduction unit can be constructed so that it converts the serial data into parallel data, and thereafter detects sync signals and composes the data.

Further, although the data recording/reproducing device described according to the above embodiments carry out both recording and reproducing data, it may be constructed so that the recording unit and reproducing unit are separated.

What is claimed is:

1. A method for reproducing information from an optical disk, comprising steps of:

(a) rotating a disk recording medium having a plurality of tracks, each track formed by connecting a plurality of sectors each having a preformatted area onto which is recorded in advance an address and a data area, wherein write information to be written in units corresponding to the sector is written in the data area in accordance with such a format that a sync signal to be used for reproduction clock synchronization is added at a head of the data area and that another sync signal to be used for resynchronization is written at intervals of a specific data length;

(b) irradiating the rotating disk recording medium with a light beam and producing a reproduced signal from a reflected light thereof;

(c) separating the reproduced signal into a reproduction signal from a leading edge of the reproduced signal and another reproduction signal from a trailing edge of the reproduced signal;

(d) generating reproduction clocks which are in bit-synchronism with the leading edge reproduction signal and trailing edge reproduction signal, respectively, by using a first sync signal and obtaining leading edge data and trailing edge data which are in synchronism with the reproduction clocks, respectively;

(e) detecting a second sync Signal to be used for re-synchronization from at least one of the leading edge data and the trailing edge data to obtain a first and a second RESYNC detection signal corresponding to the leading edge data and trailing edge data, respectively;

(f) composing data which includes correcting a change in the relative positional relationship between the leading edge data and trailing edge data by using the first and second RESYNC detection signals and synthesizing the thus corrected leading edge data and trailing edge data to produce composed data; and (g) demodulating the reproduction data;

wherein said composed data is obtained by said composing data step in such a manner that the leading edge data is sequentially stored in accordance with the reproduction clock in a first memory at an address thereof which is sequentially set from an initial address after being reset by the first RESYNC detection signal corresponding to the leading edge data, that the trailing edge data is sequentially stored in accordance with the reproduction clock in a second memory at an address thereof which is sequentially set from an initial address after being reset by the second RESYNC detection signal corresponding to the trailing edge data and that the contents of the first memory and the second memory are read by sequentially specifying the same address and the leading edge data and trailing edge data read from the first memory and the second memory are synthesized to produce the composed data.

2. A method for recording and reproducing information on/from an optical disk comprising steps of:

(a) rotating a disk recording medium having a plurality of tracks, each track formed by connecting a plurality of sectors each having a preformatted area onto which is written in advance an address and a data area;

(b) converting write information to be recorded into first coded data in the form of a run-length-limited code in accordance with a predetermined conversion rule; said write information being in units corresponding to the sector;

(c) adding a first sync signal to be used for reproduction clock synchronization at a head of the first coded data in accordance with a predetermined format and inserting a second sync signal to be used for resynchronization into the first coded data at intervals of a specific data length;

(d) converting the first coded data into which the first and second sync signals have been inserted into second coded data in accordance with a predetermined conversion rule;

(e) irradiating the disk recording medium with a light beam which is intensity-modulated in accordance with the second coded data to record information by a local temperature rise of the disk recording medium using the light beam:

(f) irradiating the rotating disk recording medium with said light beam to produce a reproduction signal from a reflection light from the rotating disk recording medium;

(g) separating the reproduction signal into a reproduction signal from the leading edge thereof and another reproduction signal from the trailing edge thereof;

(h) producing reproduction clocks which are in bit-synchronism with the leading edge reproduction signal and trailing edge reproduction signal, respectively, by using a first sync signal and deriving leading edge data and trailing edge data which are in synchronism with the reproduction clocks, respectively;

(i) detecting a second sync signal to be used for re-synchronization from at least one of the leading edge data and the trailing edge data to produce a first and a second RESYNC detection signal respectively corresponding to the leading edge data and trailing edge data;

(j) composing data which includes correcting a change in the relative positional relation between the leading edge data and the trailing edge data by using the first and second RESYNC detection signals and synthesizing the corrected leading edge data and trailing edge data to produce composed data; and (k) demodulating the reproduction data;

wherein said composed data is obtained by said composing data step in such a manner that the leading edge data is sequentially stored in accordance with the reproduction clock in a first memory at an address thereof which is sequentially set from an initial address after being reset by the first RESYNC detection signal corresponding to the leading edge data, that the trailing edge data is sequentially stored in accordance with the reproduction clock in a second memory at an address thereof which is sequentially set from an initial address after being reset by the second RESYNC detection signal corresponding to the trailing edge data and that the contents of the first memory and the second memory are read by sequentially specifying the same address and the leading edge data and trailing edge data read from the first memory and the second memory are synthesized to produce the composed data.

3. An information reproducing device for reproducing information recorded on a recording medium, comprising:

a disk recording medium having a plurality of tracks, each track including a plurality of sectors, each sector including a preformatted area onto which an address is recorded and a data area in which coded data is stored, wherein write information to be written in the disk recording medium in units corresponding to the sector is coded by a predetermined coding rule and is written in the data area in the form of a status transition pattern in accordance with such a format that a first sync signal to be used for reproduction clock synchronization is added at the head of the coded data and a second sync signal to be used for resynchronization is inserted at predetermined intervals, said second sync signal comprising a special code pattern not found in said predetermined coding rule and distinguishable from said data;

means for detecting signals indicative of positions of a leading edge and a trailing edge of status transitions in a status transition pattern recorded on the disk recording medium in the data area;

means for separating the detected signals into a leading edge data signal corresponding to the leading edges of said transition pattern and a trailing edge data signal corresponding to the trailing edges of said transition pattern;

means for producing reproduction clocks which are in bit-synchronism with the leading edge data signal and the trailing edge data signal, respectively, by using a first sync signal, and for providing leading edge data and trailing edge data which are in synchronism with said reproduction clocks, respectively;

means for detecting a second sync signal to be used for resynchronization from at least one of said leading edge data and trailing edge data and for producing a first and a second RESYNC detection signal which correspond to said leading edge data and trailing edge data, respectively;

means for composing data which includes a means for correcting a change in the relative positional relationship between the leading edge data and trailing edge data by using the first and second RESYNC detection signals and synthesizing the corrected leading and trailing edge data to produce composed data; and means for demodulating the composed data;

wherein said composed data is obtained by said means for composing data in such a manner that the leading edge data is sequentially stored in accordance with the reproduction clock in a first memory at an address thereof which is sequentially set from an initial address after being reset by the first RESYNC detection signal corresponding to the leading edge data, that the trailing edge data is sequentially stored in accordance with the reproduction clock in a second memory at an address thereof which is sequentially set from an initial address after being reset by the second RESYNC detection signal corresponding to the trailing edge data and that the contents of the first memory and the second memory are read by sequentially specifying the same address and the leading edge data and trailing edge data read from the first memory and the second memory are synthesized to produce the composed data.

4. A method for reproducing information from an optical disk, comprising steps of:

(a) rotating a disk recording medium having a plurality of tracks, each track formed by connecting a plurality of sectors each having a preformatted area onto which is recorded in advance an address and a data area into which coded data is stored, wherein write information to be written in units corresponding to the sector is coded by a predetermined rule and is written in the data area in the form of a status transition pattern in accordance with such a format that a sync signal to be used for reproduction clock synchronization is added at a head of the coded data and that a second sync signal to be used for resynchronization is written at intervals of a specific data length, said second sync signal comprising a special code pattern not found in said predetermined coding rule and distinguishable from said data;

(b) irradiating the rotating disk recording medium with a light beam and producing a reproduced signal from a reflected light thereof;

(c) separating the reproduced signal into a reproduction signal from a leading edge of the reproduced signal and another reproduction signal from a trailing edge of the reproduced signal;

(d) generating reproduction clocks which are in bit-synchronism with the leading edge reproduction signal and trailing edge reproduction signal, respectively, by using a first sync signal and obtaining leading edge data and trailing edge data which are in synchronism with the reproduction clocks, respectively;

(e) detecting a second sync signal to be used for resynchronization from at least one of the leading edge data and the trailing edge data to obtain a first and a second RESYNC detection signal corresponding to the leading edge data and trailing edge data, respectively;

(f) composing data which includes correcting a change in the relative positional relationship between the leading edge data and trailing edge data by using the first and second RESYNC detection signals and synthesizing the thus corrected leading edge data and trailing edge data to produce composed data; and (g) demodulating the composed data;

wherein said composed data is obtained by said composing data step in such a manner that the leading edge data is sequentially stored in accordance with the reproduction clock in a first memory at an address thereof which is sequentially set from an initial address after being reset by the first RESYNC detection signal corresponding to the leading edge data, that the trailing edge data is sequentially stored in accordance with the reproduction clock in a second memory at an address thereof which is sequentially set from an initial address after being reset by the second RESYNC detection signal corresponding to the trailing edge data and that the contents of the first memory and the second memory are read by sequentially specifying the same address and the leading edge data and trailing edge data read from the first memory and the second memory are synthesized to produce the composed data.

5. A method for recording and reproducing information on/from an optical disk comprising steps of:

(a) rotating a disk recording medium having a plurality of tracks, each track formed by connecting a plurality of sectors each having a preformatted area onto which is written in advance an address and a data area in which coded data is stored;

(b) converting write information to be recorded into first coded data in the form of a run-length-limited code in accordance with a predetermined conversion rule, said write information being in units corresponding to the sector;

(c) adding a first sync signal to be used for reproduction clock synchronization at a head of the first coded data in accordance with a predetermined format and inserting, as a second sync signal to be used for resynchronization, a coded pattern which is not found in the conversion rule and is distinguishable from the coded data into the first coded data at intervals of a specific data length;

(d) converting the first coded data into which the first and second sync signals have been inserted into second coded data in accordance with a predetermined conversion rule;

(f) irradiating the disk recording medium with a light beam which is intensity-modulated in accordance with the second coded data to record information by a local temperature rise of the disk recording medium using the light beam;

(g) irradiating the rotating disk recording medium with said light beam to produce a reproduction signal from a reflection light from the rotating disk recording medium;

(g) separating the reproduction signal into a reproduction signal from the leading edge thereof and another reproduction signal from the trailing edge thereof;

(h) producing reproduction clocks which are in bit-synchronism with the leading edge reproduction signal and trailing edge reproduction signal, respectively, by using a first sync signal and deriving leading edge data and trailing edge data which are in synchronism with the reproduction clocks, respectively;

(i) detecting a second sync signal to be used for re-synchronization from at least one of the leading edge data and the trailing edge data to produce a first and a second RESYNC detection signal respectively corresponding to the leading edge data and trailing edge data;

(j) composing data which includes correcting a change in the relative positional relation between the leading edge data and the trailing edge data by using the first and second RESYNC detection signals and synthesizing the corrected leading edge data and trailing edge data to produce composed data; and (k) demodulating the composed data;

wherein said composed data is obtained by said composing data step in such a manner that the leading edge data is sequentially stored in accordance with the reproduction clock in a first memory at an address thereof which is sequentially set from an initial address after being reset by the first RESYNC detection signal corresponding to the leading edge data, that the trailing edge data is sequentially stored in accordance with the reproduction clock in a second memory at an address thereof which is sequentially set from an initial address after being reset by the second RESYNC detection signal corresponding to the trailing edge data and that the contents of the first memory and the second memory are read by sequentially specifying the same address and the leading edge data and trailing edge data read from the first memory and the second memory are synthesized to produce the composed data.

* * * * *

UNITED STATES PATENT AND TRADEMARK OFFICE
CERTIFICATE OF CORRECTION

PATENT NO. : 5,519,683
DATED : 21 May 1996
INVENTOR(S) : Takuya MIZOKAMI et al.

It is certified that error appears in the above-identified patent and that said Letters Patent is hereby corrected as shown below:

| Column | Line | |
|---|---|---|
| 2 | 14 | Before "have" delete "take". |
| 2 | 20 | Change "undecidedly" to --unpredictably--. |
| 3 | 66 | Change "surely" to --reliably--. |
| 4 | 54 | Change "a still" to --yet--. |
| 5 | 18 | Change "the other" to --another--. |
| 5 | 19 | Change "is" to --are--. |
| 9 | 4 | Change "successive "0" from" to --successive "0"'s from--. |
| 9 | 8 | Change "just" to --precise--. |
| 9 | 17 | Change "just" to --precise--. |
| 9 | 25 | Change "follows" to --follow--. |

UNITED STATES PATENT AND TRADEMARK OFFICE
CERTIFICATE OF CORRECTION

PATENT NO. : 5,519,683

DATED : 21 May 1996

INVENTOR(S) : Takuya MIZOKAMI et al.

It is certified that error appears in the above-identified patent and that said Letters Patent is hereby corrected as shown below:

| Column | Line | |
|---|---|---|
| 10 | 29 | Delete "constituting". |
| 10 | 31 | Delete "any problem does not" and insert --no problems--. |
| 10 | 39 | Change "not existing" to --does not exist-- |
| 10 | 67 | Change "signals" to --signal--. |
| 11 | 38 | Change "on-edge" to --one-edge--. |
| 12 | 45 | Change "ceased" to --terminated--. |
| 13 | 7 | Change "as" to --an--. |
| 13 | 10 | After "FIG. 1," insert --comprises--. |
| 13 | 43 | After "demodulation" insert --circuit--. |
| 13 | 45 | Before "FIG. 4" insert --shown in--; before "a delay" delete "shown in". |

UNITED STATES PATENT AND TRADEMARK OFFICE
CERTIFICATE OF CORRECTION

PATENT NO. : 5,519,683
DATED : May 21, 1996
INVENTOR(S) : Takuya Mizokami et al.

It is certified that error appears in the above-indentified patent and that said Letters Patent is hereby corrected as shown below:

| Column | Line | |
|---|---|---|
| 14 | 31 | Change "explain" to --explanation--. |
| 14 | 33 | Change "to use" to --for use of--. |
| 15 | 38 | Delete "," and insert --are--; after "46" delete "are". |
| 16 | 9 | After "number of "1"'s" delete "to". |
| 16 | 10 | Delete "a larger number of "0"'s by one" and insert --one more "0"--. |
| 16 | 11 | After "(trailing edge data" insert --74--. |
| 16 | 51 | Delete "most". |

UNITED STATES PATENT AND TRADEMARK OFFICE
CERTIFICATE OF CORRECTION

PATENT NO. : 5,519,683
DATED : 21 May 1996
INVENTOR(S) : Takuya MIZOKAMI et al.

It is certified that error appears in the above-identified patent and that said Letters Patent is hereby corrected as shown below:

| Column | Line | |
|---|---|---|
| 16 | 61 | After "number of "1"'s" delete "to"; after "but" delete "a larger". |
| 16 | 62 | Delete "number of "0"'s by one" and insert --one more "0"--. |
| 17 | 2 | After "consisting" insert --of--. |
| 18 | 1 | Change "reproduction" to --composed--. |

Signed and Sealed this

Eighth Day of October, 1996

Attest:

BRUCE LEHMAN

Attesting Officer      Commissioner of Patents and Trademarks